United States Patent

[11] 3,568,030

[72] Inventor Charles E. Faxon
Veterans Administration Branch, Los Angeles, Calif. 90073
[21] Appl. No. 730,001
[22] Filed May 17, 1968
[45] Patented Mar. 2, 1971
Continuation-in-part of application Ser. No. 661,449, Aug. 17, 1967.

[54] ELECTROMAGNETIC MOTOR UTILIZING ATTRACTION AND REPULSION FORCES
4 Claims, 4 Drawing Figs.
[52] U.S. Cl. ................................................. 318/696, 318/45, 310/49
[51] Int. Cl. .................................................. H02k 37/00
[50] Field of Search ...................................... 318/45, 138, 254; 310/49

[56] References Cited
UNITED STATES PATENTS

| | | | |
|---|---|---|---|
| 2,523,503 | 9/1950 | Fairbanks | 318/8 |
| 2,808,556 | 10/1957 | Thomas | 318/45X |
| 2,830,247 | 4/1958 | Thomas | 318/138X |
| 3,005,118 | 10/1961 | Ranseen | 310/49 |
| 3,146,386 | 8/1964 | Gerber | 310/49X |
| 3,268,785 | 8/1966 | Gerber et al. | 318/45 |
| 3,293,460 | 12/1966 | Iwai et al. | 310/49 |

Primary Examiner—G. R. Simmons
Attorney—Nilsson, Robbins, Wills & Berliner

ABSTRACT: An electromagnetic motor is disclosed incorporating a plurality of rotatably mounted shafts each of which carries a plurality of individual rotors and is supported by a plurality of individual stators. The rotors and stators each incorporate electromagnets which provide the drive torque. At least one switch structure is provided on each of the shafts for synchronously controlling the currents in the electromagnets of the stators on the individual shaft so as to establish repeating cycles of attraction and repulsion in association with the magnets of the associated rotors. The aligned rotor elements on each shaft are offset from those on the other shafts so as to establish a continuity of drive torque, the shafts being mechanically coupled together through a gearbox which is in turn coupled to a drive shaft. By providing an offset relationship between the magnetic elements of the different shafts, a continuity of drive torque is established; however, the aligned electromagnets on each shaft enable double-ended operation for each internal electromagnet (excepting those of the ends).

INVENTOR
CHARLES E. FAXON

By Nelson & Robbins
ATTORNEYS

ELECTROMAGNETIC MOTOR UTILIZING ATTRACTION AND REPULSION FORCES

BACKGROUND AND SUMMARY OF THE INVENTION

This is a continuation-in-part of Pat. application Ser. No. 661,449, entitled Electromagnetic Attracting and Repelling Motor, which application is copending herewith.

In general, the prior application discloses a plurality or of rotor-stator structures carried on a shaft and supporting circular arrays of electromagnets through which electrical current is synchronously switched to establish attracting and repelling forces that revolve the unit and provide an output torque. In that system, the electromagnets (carried on the rotating shaft) are disclosed to be angularly offset between individual rotors. However, it has now been discovered that a considerably more effective motor results by utilizing a plurality of mechanically intercoupled rotary shafts, with the electromagnets on each shaft aligned. Such a structure improves the magnetic circuit and affords double-ended operation for individual electromagnets, while still accomplishing continuous drive torque, by offsetting the magnetic elements on the different shafts. Thus, an effective efficient and smooth motor is provided which may be effectively incorporated as the basic element in a vehicular propulsion system.

BRIEF DESCRIPTION OF THE DRAWINGS

In the drawing, which constitute a part of this specification, an exemplary embodiment demonstrating various objectives and features hereof is set forth as follows:

FIG. 3 is a fragmentary side elevation of a portion of the structure shown in FIG. 2.

DESCRIPTION OF THE ILLUSTRATIVE EMBODIMENT

As required, a detailed illustrative embodiment of the invention is disclosed herein. However, it is to be understood that the embodiment merely exemplifies the invention which may take many different forms that are radically different from the specific illustrative embodiment disclosed herein. Therefore, specific structural and functional details disclosed herein are not to be interpreted as limiting, but merely as a basis for the claims defining the scope and content of the invention.

Figure 1:
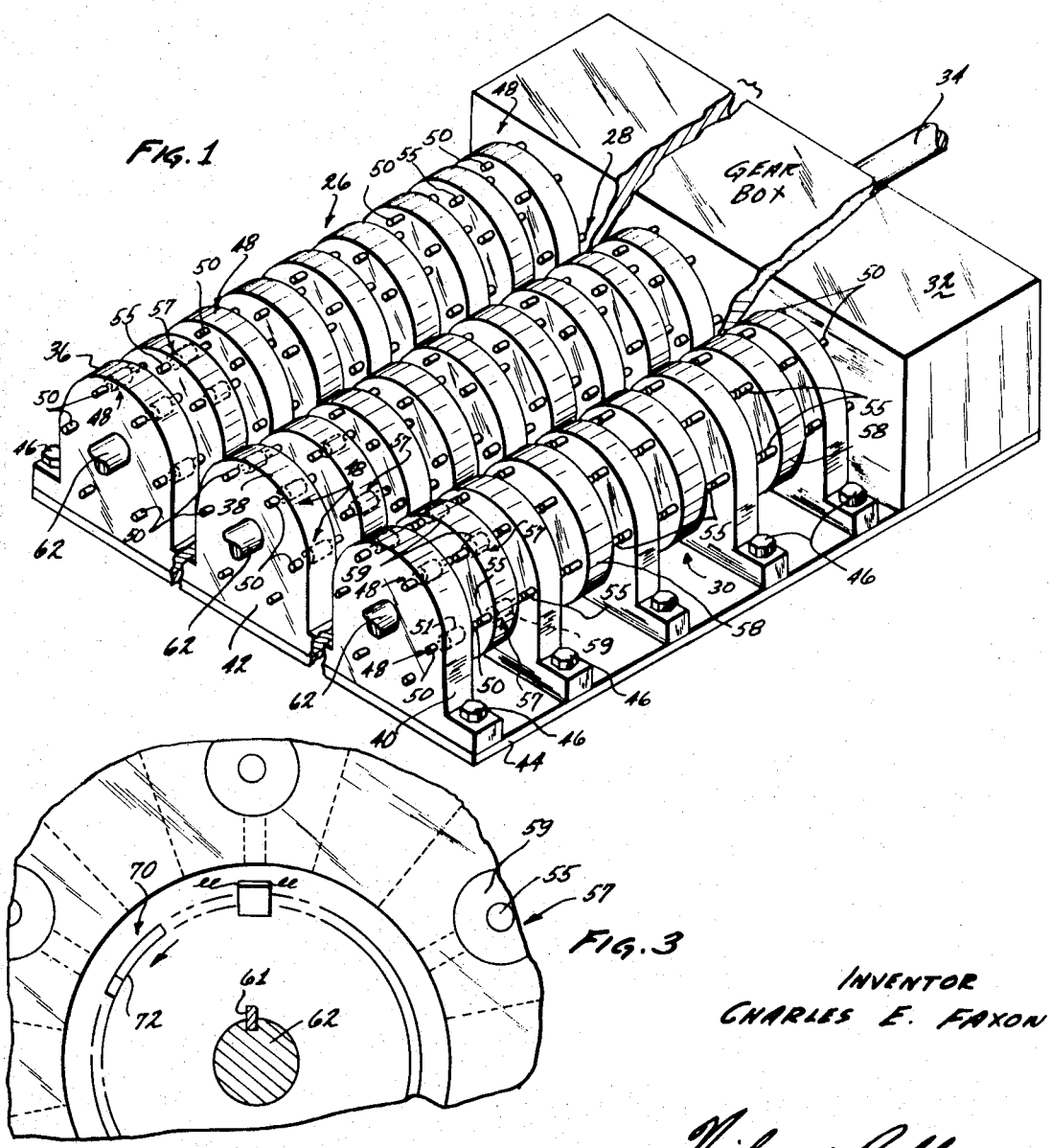
FIG. 1 is a fragmentary perspective view of a motor constructed in accordance with the present invention.

Considering the structure of the motor, reference will be made initially to FIG. 1 which shows the motor consisting of three distinct rotary units 26, 28 and 30 spaced apart from each other, while each is coupled to a gearbox 32 from which an output shaft 34 is provided. In general, the rotary units 26, 28 and 30 are identical, each including interleaved rotors and stators, both of which carry radially disposed electromagnets which provide magnetic drive forces. The sets of individual electromagnets which move in each of the rotary units are aligned parallel to the central axis; however, in each rotary unit, they are offset from those in another rotary unit, so as to provide a substantially continuous drive torque. In such an arrangement, the electromagnets are incorporated in continuous magnetic circuits in which both ends of the internal electromagnets serve to accomplish driving torque. The separation between the rotary units is sufficient to avoid any significant interference between the magnetic fields of each unit.

Considering the structure in greater detail, the similar rotary units 26, 28 and 30 each include a plurality of separate rotors and stators aligned along the axis of rotation. The sets of traversely aligned stators 36, 38 and 40 in the three rotary units may comprise a single unitary member. That is, the sets of three individual stators 36, 38 and 40 may be formed from an integral block 42 which is affixed to a platform 44 by bolts 46. Each set of three stators may comprise a similar block and each contains three circular arrays of individual electromagnets 48. That is, six electromagnets 48 are radially spaced about each of the stators, and provide pole pieces 50 extending in axial alignment. The stator and rotor electromagnets are similar each including a coil or winding disposed on a pole piece. Specifically, the uniformly aligned stator electromagnets 48 each include a pole piece 50 carrying a winding 51. These electromagnets 48 are fixed in the blocks 42 (as being cast in situ) which may comprise plastic resin. The end blocks may be magnetically oriented to accomplish a circuit. The similarity of these elements affords considerable economy in manufacture.

All the rotors 58 in the unit are also similar and also may be formed of nonmagnetic material as resin-impregnated fiber glass, affording strength and light weight. The rotor electromagnets 57 are fixed in a circular array in each rotor 58 and each comprises a pole piece 55 carrying a winding 59. The rotors 58 in each of the rotary units 26, 28 and 30 are in keyed alignment on central shafts 62. Each of the shafts 62 is journaled through its associated stators and is terminated in the gearbox 32 which includes gear means for locking the shafts 62 in fixed relationship, and provides drive power to an output shaft 34.

As described above, the individual rotary units 26, 28 and 30 are similar to nature; however, it is important to understand that the relationship between the rotor electromagnets 57 (contained in the rotors 58) of each rotary unit are offset as a gang with respect to each other rotary unit. That is, the rotors 58 in each of the rotary units 26, 28 and 30 are keyed to their individual shaft 62 (key 61, FIG. 3) with their electromagnets 57 in axial alignment. However, the electromagnets 57 in each rotary unit, are offset, as by 20°, from those of the other rotary units, to accomplish a staggered relationship between the rotary units 26, 28 and 30 which provides more uniform torque from the motor.

Figure 2:
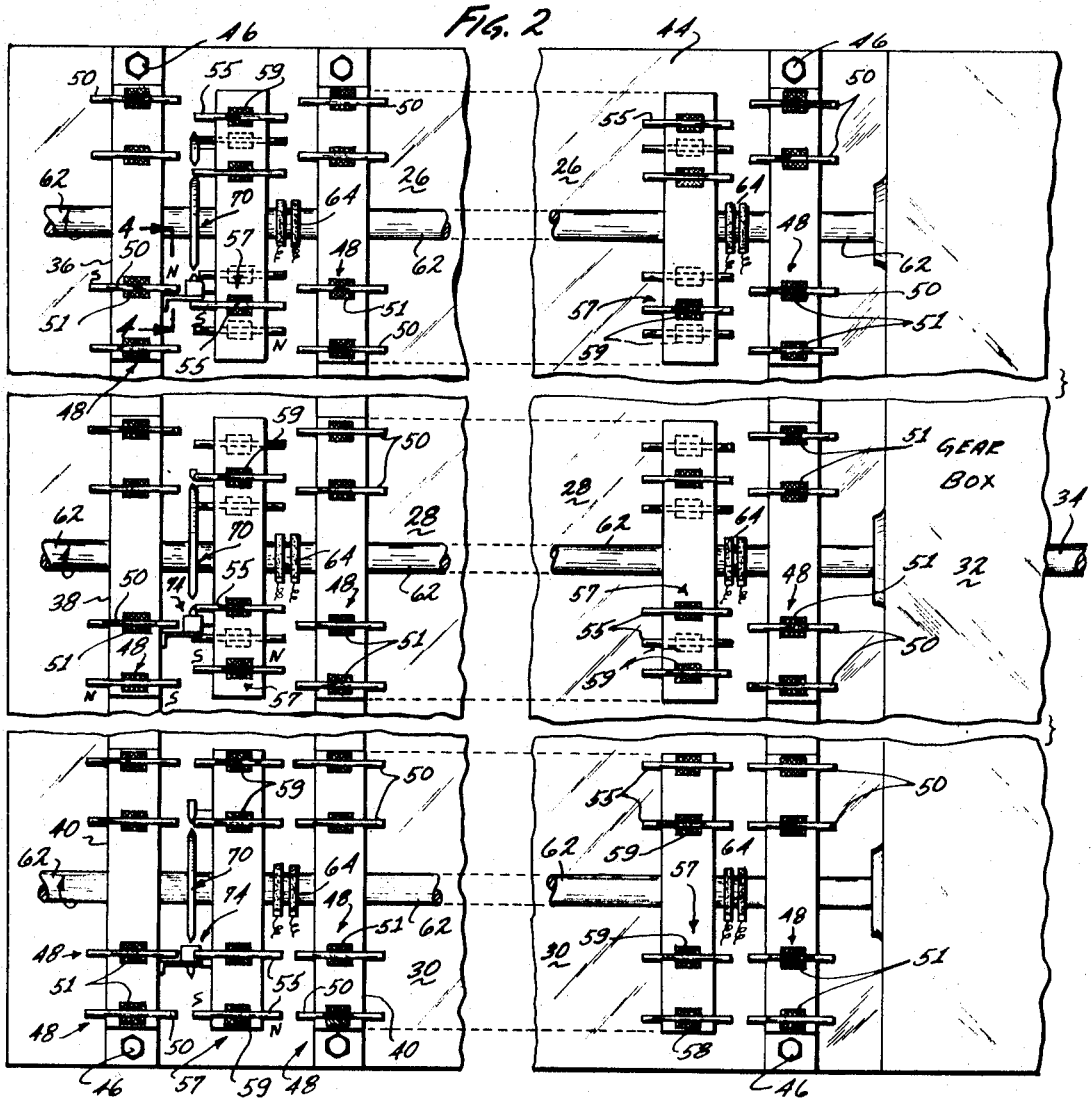
FIG. 2 is a fragmentary plan view of the structure of FIG. 1.

Referring to FIG. 2, from which the relationship between the electromagnets may be more clearly understood, it is to be noted that in the rotary position shown, the rotor electromagnets 57 in the lower rotary unit 30 carry pole pieces 55 which are in axial alignment with the stator pole pieces 50 contained in the aligned stators 40. However, in the centerrotary unit 28, the rotor pole pieces 55 are advanced in the direction of rotation as indicated from the stator pole pieces 50. In the top rotary unit 26 the rotor pole pieces 55 have not reached the stator pole pieces 50. Thus, an angular offset relationship exists between the rotor-carried pole pieces 55 in each of the rotary units 26, 28 and 30 so as to accomplish an offset of the driving torque developed by each rotary unit.

In the operation of the motor, the rotor electromagnets 57 are energized by an intermittent unidirectional current as from a battery, so that their pole pieces 55 (FIG. 2) are repeatedly similarly polarized. However, the stator windings 51 receive an alternating (bidirectional) current to accomplish alternate attracting and repelling relationships with the rotor electromagnets. Referring to FIG. 2, the stator electromagnets 48 must be either repelling, attracting or neutral with respect to the rotor electromagnets 57. That is, as the rotor electromagnets 57 receive unidirectional current they establish a polarity, of north-south as indicated. As shown in FIG. 2, the stator pole pieces 50 (in the stators 40) must be energized alternately with reversing polarity and neutralized. Specifically, the stators 40 in the lower rotary unit 30 are in a dead center position in which both the stator and rotor pole pieces are neutral. However, in the center rotary unit 28, the rotor pole pieces 55 have passed the stator pole pieces 50 with the result that repelling forces are desirable between the pole. To provide such forces, the stator electromagnets 48 in the stators 38 are driven with electrical current to establish the indicated polarity. As a result, repulsion forces are provided between the stator pole pieces 50 in the stator 38 and rotor pole pieces 55.

In the upper rotary unit 26, (FIG. 2) the rotor pole pieces 55 are shown to be approaching the stator pole pieces 50. Accordingly, the contiguous ends of the pole pieces are provided with opposing polarity by reversing the current through the stator windings 51 from the direction existing for such currents in the center stators 38.

In the operation of the motor each of the rotary units 26, 28 and 30 variously occupy the positions in which they are individually depicted in FIG. 2. Therefore, although the rotor windings 59 (in the rotors 58) are intermittently similarly energized with respect to polarity, the stator electromagnets 48 (in the stators) are driven by a bidirectional current. As a related consideration, the electrical currents for driving the individual rotor windings 59 are provided through slip rings 64 as well known in the prior art. Each of the shafts 62 also carries a switching track 66 which engages a reversing switch to accomplish the directional alternating current through the stator windings 51 and the interruption of the current through the rotor windings 59 in synchronism with the instant position of the associated rotor.

The track 70 (FIGS. 2, 3 and 4) at least one of which is provided for each of the shafts 62, includes a plurality of spaced-apart rim sections 72 (FIGS. 3 and 4) having tapered leading ends 73 of critical length. The rim sections 72 communicate with switch boxes 74 (FIG. 4) that are formed of nonconducting material (shown in phantom) and support switching leaves 76 and 78 which alternately contact a pair of switch bars 80 and 82. Specifically, in the position as shown, the switch leaf 78 engages the switch bar 80 while the switch leaf 76 engages the switch bar 82. However, when the rim section 70 is disposed in the box 74, the reverse situation occurs and the leaf 78 contacts the bar 82 while the leaf 76 contacts the bar 80.

Figure 4:
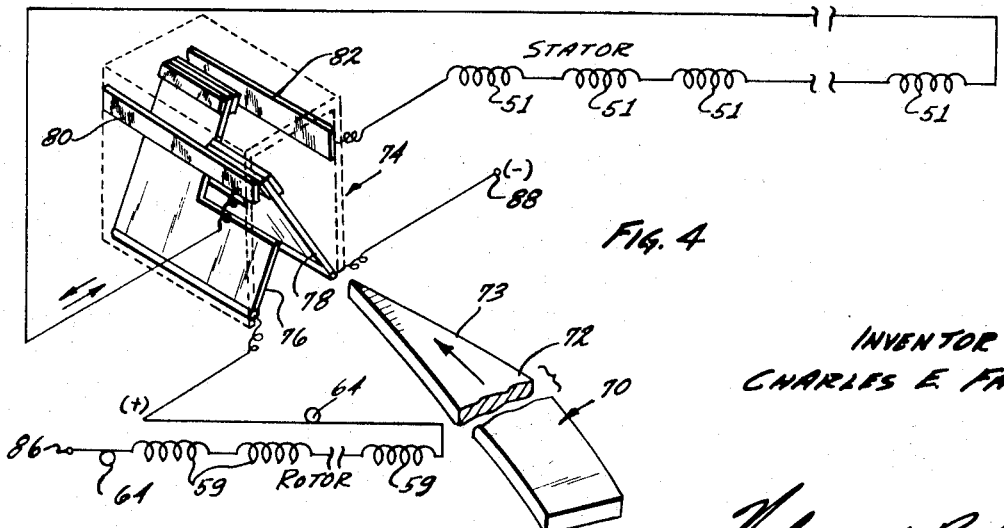
FIG. 4 is a perspective and schematic illustration of a portion of the electrical system embodied in the structure of FIG. 1.

The switching apparatus as shown in FIG. 4 is connected in an electrical circuit that includes the individual stator windings 51. Specifically, a circuit is connected from the bar 82 through all of the coils 51 (in serial configuration) than returning to the bar 80. The switch leaves are then connected in series with the rotor winding 59, across a source of direct current. Specifically, the rotor windings 59 in a rotary unit are connected between a terminal 86 and the switch leaf 76. The other leaf 78 is connected to a negative potential applied at a terminal 88. Thus, depending upon whether the rim section 70 is within or without the box 74, the current through the individual coils 51 flows either from right to left or from left to right.

When the rim sections 70 initially enter one of the boxes 74, the tapered forward end 73 contacts the leaves 76 and 78, smoothly accomplishing the desired switching, operation. Additional, it is to be noted that during the time when the leaves 76 and 78 are moving, no current flows through either the coils 51 or 59. That interval coincides to the period during which opposing pole pieces are in a dead center position. As a result, faced opposing pieces of associated rotors and stators are permitted to pass without forces which would otherwise tend to brake the revolving shaft 62.

Summarizing the operation of the system electrical current flows through the slip rings 64 (FIG. 2) associated with each of the rotors in the system thereby energizing the rotor electromagnets 57 in each of the rotors to provide similar polarity magnetic fields. Concurrently, electrical current is supplied through the switching structures associated with each of the shafts 62 to the stator windings 51 (FIG. 4). The direction of the current through the stators 84 is provided so that attracting or repelling forces are developed between the stator electromagnets 48 and the rotor electromagnets 57. As a result, the shafts 62 (coupled together by the gearbox 32) begin to turn supplying output drive to the shaft 34. The resulting output is of rather continuous torque and may be variously utilized in any of a variety of propulsion or other systems.

As indicated above, the polarity of the current through the stator windings 51 is synchronously reversed in accordance with the instant position of the rotors. As a result, effective mechanical drive power of continuous torque is provided from a system which has been found to be particularly efficient. It is to be noted that the internal pole pieces of both the rotors and the stators are effectively utilized in a dual capacity. That is, each end of the internal pole piece functions in an attracting-repelling relationship with another pole piece. Furthermore, in the system as disclosed effective magnetic circuits are provided, e.g. with return through the shafts 62. It is to be noted, that the system is unidirectional in operation, affording a distinct advantage in many applications. Also, the possibilities for great drive torque are presented by reason of the lever arm which may be provided to the magnets.

Of course, various other objects and advantages of the present invention will become readily apparent to one skilled in the art. As a result, the scope hereof is to be interpreted with regard to the claims as supported by the disclosed embodiment. In that regard, the claims are set forth below.

I claim:

1. An electric motor for providing rotary drive power from a source of electrical power, comprising;
    a plurality of rotatably mounted shafts;
    gearing means for interconnecting said shafts together for mutual rotation;
    a like plurality of rotors each supportably affixed on each of said shafts, each of said rotors including a multiplicity of magnetic means polarly disposed parallel to the axes of rotation of said shafts;
    a like plurality of stators each fixed in stationary relationship in combination with one of said rotors, each of said stators including a multiplicity of electromagnets having pole pieces therein, said electromagnets affixed in said stators to dispose said pole pieces in parallel relationship to the magnetic means of a related rotor, said pole pieces and said magnetic means of each stator and rotor combinations being offset in relationship to the pole pieces and magnetic means of each other stator and rotor combination to provide a staggered drive relationship between the stator and rotor combinations; and
    a like plurality of switching means, one being coupled to each of said shafts for supplying electrical current to said electromagnets in phase synchronization with the position of the rotors of each of said stator and rotor combinations whereby to propel said shafts.

2. A system according to claim 1, wherein said switching means includes a bidirectional switch whereby to alternately drive said electromagnets in attracting and repelling relationship.

3. A system according to claim 2, wherein said switching means comprises at least one cam track affixed to be revolved with one of said shafts and at least one double-throw switch including contacts for engaging said cam track whereby to synchronously reverse current flow through said electromagnets of said stators.

4. A system according to claim 1 wherein said electromagnets in each of said stators are connected in electrical series relationship.